United States Patent Office 3,097,189
Patented July 9, 1963

3,097,189
DIELS-ALDER POLYMERS CURED WITH
ORGANIC PEROXIDES
Bernard O. Baum, Plainfield, N.J., assignor to Union
Carbide Corporation, a corporation of New York
No Drawing. Filed Oct. 28, 1960, Ser. No. 65,605
10 Claims. (Cl. 260—65)

This invention relates to method for improving the toughness, stress cracking resistance and chemical resistance of Diels-Alder polymers. Additionally, the invention relates to Diels-Adler polymers so improved.

The term "Diels-Alder polymers" as used herein refers to polyimides having the repeating unit

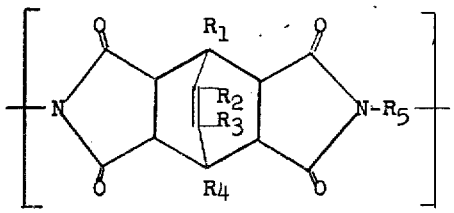

wherein $R_1$, $R_2$, $R_3$ and $R_4$ are hydrogen, halogen such as chlorine, and hydrocarbons such as alkyl, aryl, alkaryl, aralkyl, alkoxy and like groups and $R_5$ is a divalent hydrocarbon group such an alkylene, arylene, alkarylene or aralkylene group.

These Diels-Alder polymers are prepared by the reaction of bi-functional dienes such as cyclopentadienones, thiophene dioxides and 2-pyrones which can be represented by the formula

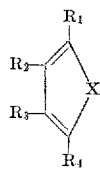

wherein X is either a carbonyl ($>$C=O), sulfonyl ($>$SO$_2$) or carbonyloxy

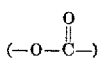

radical respectively, and $R_1$, $R_2$, $R_3$ and $R_4$ are as above, with dienophilic compounds such as the bis-maleimides, for example N,N'-hexamethylenediamine bis-maleimide, N,N'-heptamethylene bis-maleimide, N,N'(3,3'-dimethyldiphenyl)bis-maleimide and N,N'-(4,4'-diphenylmethane) bis-maleimide, i.e. $R_5$ is respectively hexamethylene, heptamethylene, 3,3'-dimethyldiphenyl and diphenylmethane. Suitable methods for the preparation of these Diels-Alder polymers are detailed in U.S. Patents 2,890,206 and 2,890,207 to E. Kraiman.

The above Diels-Alder polymers are stiff, tough materials characteristiaclly having high melting points. Films or sheets fabricated from these polymers have exceptionally high tensile strengths for amorphous polymers and excellent electrical properties at high temperatures. Further their resistance to dilute alkali and acid solutions is very good. Under some circumstances, however, as when contacted with chemically active environments such as alcohols, ketones, essential oils and detergents the polymer may craze and stress crack.

It is an object, therefore, of the present invention to provide a method for improving the stress-cracking properties as well as the toughness and chemical resistance properties of Diels-Alder polymers.

It is another object to provide Diels-Alder polymers which can be fabricated into numerous useful shapes having improved stress-cracking properties.

These and other objects are achieved in accordance with the present by blending together in an intimate mixture a Diels-Alder polymer and an organic peroxide, and reacting the polymer and peroxide together. Preferably the intimate blending is accomplished by dissolving the polymer and the organic peroxide in a mutual solvent, reacting them together, separating the solvent and thereafter curing, i.e., thermosetting the polymer mass. Reaction of the polymer and organic peroxide causes crosslinking of adjacent polymer molecules. Diels-Alder polymers crosslinked with peroxides when fabricated and cured can be stressed considerably and contacted while stressed with chemically active agents without crazing or stress cracking. Physical properties of the polymers, e.g., tensile impact strength, are also improved.

Suitable organic peroxides for crosslinking the Diels-Alder polymers are organic peroxides having the general formula:

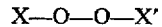

X—O—O—X' wherein X is a hydrocarbon or oxyhydrocarbon group, e.g., an alkyl, cycloalkyl, aryl, aralkyl or acyl radical and X' is hydrogen, a hydrocarbon or oxyhydrocarbon group, e.g., alkyl, aryl, aralkyl, or acyl. Specific examples of the above organic peroxides which are deserving of special mention are: where X and X' are alkyl, dimethyl peroxide, diethyl peroxide, and di-t-butyl peroxide; where X and X' are aralkyl, dicumyl peroxide; where X and X' are acyl, di-acetyl peroxide, dipropionyl peroxide, dibutyryl peroxide, bis(heptafluorobutyryl)peroxide, diocyanoyl peroxide, dilauroyl peroxide, dibenzoyl peroxide, methoxy, methyl, t-butyl, chloro, bromo and cyano substituted benzoyl peroxides, bis-(p-chlorobenzoyl)peroxide, diisopropyl peroxydicarbonate, bis(2,4-dichlorobenzoyl)peroxide, anisoyl peroxide; where X is alkyl, alkaryl, or cycloalkyl and X' is hydrogen, t-butyl hydroperoxide, n-octyl hydroperoxide, cumene hydroperoxide, diisopropyl benzene hydroperoxide, tetralyl hydroperoxide, p-menthane hydroperoxide, pinane hydroperoxide and 2,5-dimethylhexane-2,5-dihydroperoxide; where X is acyl and X' is alkyl, cycloalkyl, aryl, hydrogen, t-butyl-peracetate, t-butyl-perbenzoate, di-t-butyl-diperphthalate and t-butyl-peroxyisobutyrate, peracetic acid, cyclohexanone peroxide, hydroheptyl peroxide and methyl ethyl ketone peroxide. Organic peroxides wherein X and X' in the above formula are each a member selected from the group consisting of alkyl radicals having from 1 to 8 carbon atoms, aralkyl radicals having up to 10 carbon atoms and aryl radicals having from 7 to 13 carbon atoms are particularly preferred.

The blending together of the organic peroxide and the Diels-Alder polymer can be accomplished in any manner conventional in the art for blending additives in thermoplastics and which provides an intimate mixture of the additive with the resin. Because of the characteristically high melting points of the Diels-Alder polymers and the heat sensitivity of most organic peroxides, milling the organic peroxide into the polymer, as on a two-roll mill is less desirable for achieving admixture than lower temperature blending methods. Powdered organic peroxides can be tumbled or otherwise intimately blended with powdered Diels-Alder polymer with good cross-linking results in subsequent cure. Preferred for blending is co-dissolving the polymer and the organic peroxide in an appropriate solvent. This provides an excellent, highly uniform mixture and a good crosslinked resin upon cure. Among the solvents useful for this purpose are amide solvents, e.g., dimethylformamide, halogenated hydrocarbon solvents, e.g., dichlorobenzene and α-chloronaphthalene, cyclic ether solvents, e.g., dioxane and tetrahydrofuran, nitrile and nitro solvents, e.g., acetonitrile and nitroethane, and phenol solvents, e.g., cresols.

Co-dissolution can be carried out at room temperature (about 25° C.) most conveniently, but lower temperatures, down to freezing point of the solvent used or higher temperatures up to the boiling point of the solvent used can be employed in the blending step. The particular pressure used does not appear critical with both sub-atmospheric and super-atmospheric pressures being suitable. Atmospheric pressure of course is most convenient and is, therefore, preferred.

In a preferred method of carrying out the co-dissolution the Diels-Alder polymer is first dissolved in the solvent. Only enough solvent to dissolve the polymer need be used. Then the peroxide is added, suitably in concentrations of from 0.25 to 25% and preferably from 1.0 to 10% by weight, based on the weight of the polymer. The increase in crosslinking obtained by using above 10% to 25% ordinarily is not sufficient to justify the increased cost, hence only where a very highly crosslinked polymer is desired will the amount of peroxide exceed 10% by weight.

The blended organic peroxide and Diels-Alder polymer are reacted together by heating an intimate mixture thereof prepared by methods such as those given above. If the solvent method of blending is used casting the polymer from the solution and curing is a convenient fabricating method. If the powder blend is the method used compression molding, powder molding and fluid bed coating are suitable means of fabricating and curing the blended mass and crosslinking the Diels-Alder polymer.

The time and temperature of cure are correlative factors which depend upon the particular Diels-Alder polymer used, the organic peroxide employed, and the fabrication method selected and will be obvious to those in the art. Cure can be accomplished by leaving the organic peroxide and polymer in contact at room temperature for a sufficient time or by heating to a temperature up to the melting point of the polymer, or even higher, in certain fabrication techniques. The particular time and temperature used for cure will ultimately depend on the polymer and the organic peroxide. Slower reacting peroxides, i.e., those which decompose to reactivate residues less rapidly, must be heated to higher temperatures or contacted with the polymer for longer times. Cure times of about an hour at from 50 to 200° C. are sufficient for many organic peroxides and are preferred for cure with the preferred organic peroxides of this invention mentioned above.

There follow examples of the practice of my invention. All parts and percentages are by weight.

EXAMPLE 1

A Diels-Alder polymer prepared from 2,5-dimethyl-3,4-diphenylcyclopentadienone,

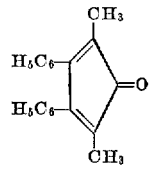

and N,N'-(hexamethylene-bis-maleimide),

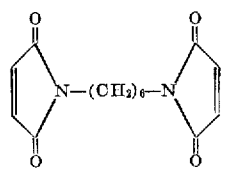

according to the method of U.S. 2,890,206 was dissolved in dimethylformamide at a 20% concentration together with 3% benzoyl peroxide based on the polymer. A film 1 mil thick was cast from this solution onto glass, vacuum dried and cured at 80° C. for an hour in a circulating air oven.

The film was cut into strips. A strip bent around the finger and touched with a glass rod wetted with isopropanol did not craze or crack.

A control film also 1 mil thick and prepared by casting from dimethylformamide solution, but without being first crosslinked with peroxide, crazed and stress cracked immediately.

Tensile impact strength was determined by mounting a dumbbell specimen ⅜" by 2½" in a position such that a high rate of loading was applied parallel to the long direction of the specimen. Results are reported as modulus of toughness in foot-pounds per cubic inch of specimen.

The control film had a tensile impact strength of 36 foot pounds. The crosslinked polymer of this invention had a tensile impact strength of 56 foot pounds.

The solubility of the films was tested by heating at 60° C. to 0.3 gram samples of the crosslinked film and the control film in a 100 mesh wire cage in a 25/75 mixture of dimethylformamide and chloroform. The control film quickly dissolved completely. The crosslinked film was only 60% dissolved (60% solubles) after 16 hours at 60° C.

Additional examples follow showing varying concentrations and types of organic peroxides. Results of Examples 1–6 are summarized in Table I.

EXAMPLE 2

The procedure of Example 1 was followed but only 0.1% of benzoyl peroxide was used to crosslink the polymer. The stress crack resistance was improved and tensile impact strength was improved.

EXAMPLE 3

The procedure of Example 1 was followed but only 1.0% of benzoyl peroxide was used. Crazing and stress cracking resistance was excellent as indicated by the absence of these phenomena when tested as above and there was a great improvement in tensile impact strength.

EXAMPLE 4

The procedure of Example 1 was followed except that 6% of benzoyl peroxide was used. Again the stress-cracking resistance was excellent. The tensile impact strength was not measured but from the extent of crosslinking as shown by the percent solubles it was likely substantially better than found in Example 1.

EXAMPLE 5

The procedure of Example 1 was followed except that t-butyl perbenzoate was used as the organic peroxide. Cure was for the same time but at 140° C. Percent solubles was only 30% and tensile impact was 90 foot-pounds. Again, crazing and stress-cracking resistance was excellent.

EXAMPLE 6

The procedure of Example 1 was followed except that lauroyl peroxide was used as the organic peroxide. Cure was for the same time but at 100° C. Percent solubles was 45% and tensile impact strength was 68 foot pounds. Again, crazing and stress-cracking resistance was excellent.

The results of Examples 1–6 and those of a control for comparison are summarized in Table I below.

*Table I*
ORGANIC PEROXIDE

| | Benzoyl Peroxide | | | | | Tert-Butyl Perbenzoate, 3% | Lauroyl Peroxide, 3% |
|---|---|---|---|---|---|---|---|
| | 0 | 0.1% | 1% | 3% | 6% | | |
| | Control | Ex. 2 | Ex. 3 | Ex. 1 | Ex. 4 | Ex. 5 | Ex. 6 |
| Solubles | 100 | 95 | 80 | 60 | 40 | 30 | 45 |
| Stress cracking | yes | very little | none | none | none | none | none |
| Tensile Impact | 36 | 39 | 54 | 56 | ------ | 90 | 68 |

Organic peroxide concentrations of 1% to 6% of the polymer weight are particularly preferred.

EXAMPLE 7

The procedure of Example 1 was followed except that dicumyl peroxide was the organic peroxide. The Diels-Alder polymer was prepared from 2,5-dimethyl-3,4-diphenyl cyclopentadienone and N,N'(4,4'-diphenylmethane)bis-maleimide,

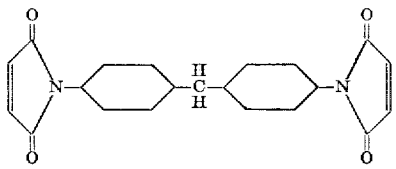

Curing was for 30 minutes at 170° C. Test results appear in Table II.

EXAMPLE 8

The procedure of Example 1 was followed except that dicumyl peroxide was the organic peroxide. The Diels-Alder polymer was prepared from 2,5-dimethyl-3,4-diphenyl cyclopentadienone and N,N'-biphenyl bis-maleimide,

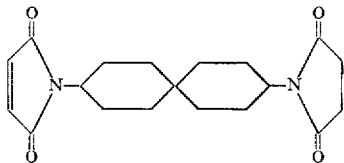

Curing was for 30 minutes at 170° C. Test results appear in Table II.

EXAMPLE 9

The procedure of Example 1 was followed except that dicumyl peroxide was the organic peroxide. The Diels-Alder polymer was prepared from 2,5-dimethyl-3,4-diphenyl cyclopentadienone and N,N'-heptamethyl bis-maleimide.

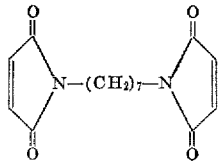

Curing was for 30 minutes at 170° C. Test results appear in Table II.

*Control.*—Each of the polymers used in Examples 7–9 was also tested without being crosslinked. Results appear in Table II.

*Table II*

BIS MALEIMIDE

| | Percent dicumyl peroxide | Percent solubles | Stress crazing |
|---|---|---|---|
| Ex. 7 | 3 | 78 | no. |
| Control | 0 | 100 | yes. |
| Ex. 8 | 3 | 83 | no. |
| Control | 0 | 100 | yes. |
| Ex. 9 | 3 | 62 | no. |
| Control | 0 | 100 | yes. |

In each instance there was crosslinking as shown by the reduced percent solubles and hence improved stress cracking and tensile strength.

What is claimed is:

1. Method for preparing thermoset Diels-Alder polymers having improved stress-cracking resistance which comprises intimately blending together a thermoplastic Diels-Alder polymer having the repeating unit

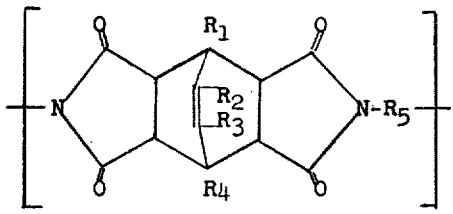

wherein $R_1$, $R_2$, $R_3$ and $R_4$ are each selected from the group consisting of hydrogen, halogen and hydrocarbons and $R_5$ is a divalent hydrocarbon, and from 0.25% to 25% by weight based on the polymer of an organic peroxide and curing the mixture.

2. The method claimed in claim 1 wherein the organic peroxide is dicumyl peroxide.

3. The method claimed in claim 1 wherein the organic peroxide is benzoyl peroxide.

4. The method claimed in claim 1 wherein the organic peroxide is t-butyl perbenzoate.

5. The method claimed in claim 1 wherein the organic peroxide is lauroyl peroxide.

6. Method for preparing thermoset Diels-Alder polymers having improved stress-cracking resistance which comprises intimately blending together a thermoplastic Diels-Alder polymer having the repeating unit

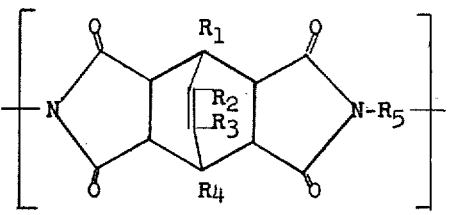

wherein $R_1$, $R_2$, $R_3$ and $R_4$ are selected from the group consisting of hydrogen, halogen and hydrocarbons and $R_5$ is a divalent hydrocarbon, and from 0.25 to 25% by weight based on the polymer of an organic peroxide having the formula

$$X-O-O-X'$$

wherein X and X' are each members selected from the group consisting of alkyl radicals having from 1 to 8 carbon atoms, alkyl radicals from 7 to 10 carbon atoms and aryl radicals having from 7 to 13 carbon atoms, and curing the mixture.

7. Method for preparing thermoset Diels-Alder polymers having improved stress-cracking resistance which comprises intimately blending together a thermoplastic Diels-Alder polymer having the repeating unit

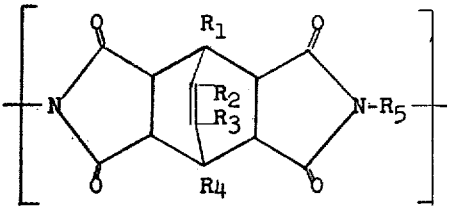

wherein $R_1$, $R_2$, $R_3$ and $R_4$ are selected from the group consisting of hydrogen, halogen and hydrocarbons and $R_5$ is a divalent hydrocarbon group and from 0.1% to 10% by weight based on the polymer of an organic peroxide selected from the group consisting of dialkyl peroxides, diacyl peroxides, hydroperoxides, peroxy esters, peroxides of carbonyl compounds and peroxy acids and curing the mixture.

8. Method for preparing thermoset Diels-Alder polymers having improved stress-cracking resistance which comprises intimately blending together a thermoplastic Diels-Alder polymer having the repeating unit

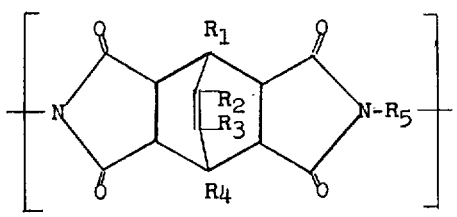

wherein $R_1$, and $R_4$ are methyl groups and $R_2$ and $R_3$ are phenyl groups and $R_5$ is a divalent hydrocarbon and from 1.0 to 6% by weight based on the polymer of an organic peroxide and curing the mixture.

9. Method for crosslinking thermoplastic Diels-Alder polymers comprising dissolving a thermoplastic Diels-Alder polymer having the repeating unit

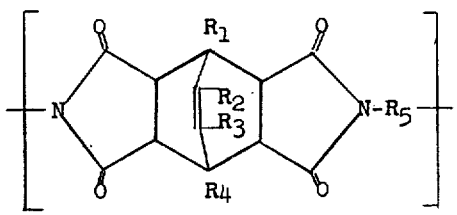

wherein $R_1$, $R_2$, $R_3$ and $R_4$ are selected from the class consisting of hydrogen, halogen, and hydrocarbon groups and $R_5$ is a divalent hydrocarbon, in a solvent, dissolving from 0.25 to 25% by weight based on the polymer of an organic peroxide in the solution, and heating the mixture until cured.

10. The thermoset cured reaction product of a Diels-Alder polymer having the repeating formula

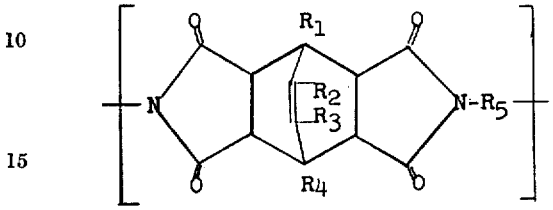

wherein $R_1$, $R_2$, $R_3$ and $R_4$ are each seelcted from the group consisting of hydrogen, halogen, and hydrocarbons and $R_5$ is a divalent hydrocarbon and from 0.25 to 25% by weight of an organic peroxide.

References Cited in the file of this patent
UNITED STATES PATENTS

| | | |
|---|---|---|
| 2,273,891 | Pollack et al. | Feb. 24, 1942 |
| 2,890,206 | Kraiman | June 9, 1959 |
| 2,890,207 | Kraiman | June 9, 1959 |
| 2,958,672 | Goldberg | Nov. 1 1960 |

UNITED STATES PATENT OFFICE
CERTIFICATE OF CORRECTION

Patent No. 3,097,189　　　　　　　　　　　　　　July 9, 1963

Bernard O. Baum

It is hereby certified that error appears in the above numbered patent requiring correction and that the said Letters Patent should read as corrected below.

Column 1, line 56, for "characteristiaclly" read -- characteristically --; column 3, line 39, for "reactivate" read -- reactive --; column 6, line 49, for "alkyl radicals" read -- aralkyl radicals having --; column 8, line 19, for "seelcted" read -- selected --.

Signed and sealed this 2nd day of June 1964.

(SEAL)
Attest:

ERNEST W. SWIDER　　　　　　　　　　　　　　EDWARD J. BRENNER
Attesting Officer　　　　　　　　　　　　　　Commissioner of Patents